United States Patent [19]

Mitchell et al.

[11] 3,927,363

[45] Dec. 16, 1975

[54] CURRENT LIMITED SELF-SATURATING DC/DC CONVERTER

[75] Inventors: Daniel M. Mitchell; Robert H. Ternowski, both of Cedar Rapids, Iowa

[73] Assignee: Rockwell International Corporation, El Segundo, Calif.

[22] Filed: Feb. 10, 1975

[21] Appl. No.: 548,309

[52] U.S. Cl. ............ 321/11; 321/18; 321/45 R; 331/113 A
[51] Int. Cl.² ........................................ H02M 1/18
[58] Field of Search ............ 321/11, 14, 18, 45 R; 331/113 A

[56] References Cited
UNITED STATES PATENTS

| | | | |
|---|---|---|---|
| 3,667,027 | 5/1972 | Martin | 321/11 |
| 3,670,234 | 6/1972 | Joyce | 321/11 X |
| 3,721,836 | 3/1973 | Rippel | 321/11 X |
| 3,748,536 | 7/1973 | Andresen | 321/14 X |
| 3,859,586 | 1/1975 | Wadlington | 321/18 |
| 3,863,125 | 1/1975 | Tollrian et al. | 321/11 |

*Primary Examiner*—William M. Shoop
*Attorney, Agent, or Firm*—Howard R. Greenberg; Robert J. Crawford

[57] ABSTRACT

Switching current spikes are limited in a self-saturating DC/DC converter by sensing the instantaneous switching element current to develop a cutoff signal at some predetermined current level which enables a cutoff circuit to quickly switch off the conducting switching element at that time.

4 Claims, 2 Drawing Figures

CURRENT LIMITED SELF-SATURATING DC/DC CONVERTER

The invention was made in the course of or under a contract with the Department of the U.S. Air Force.

BACKGROUND OF THE INVENTION

The invention disclosed herein pertains generally to DC/DC power converters and specifically to those of the self-saturating type.

Because of their simplicity, self-saturating DC/DC power converters (such as described in U.S. Pat. No. 2,783,384) are popular devices for converting DC voltages from one level to another, particularly when weight and size are important factors. Their high power/weight ratio resulting from the simplified design and use of transistors makes them highly suitable for applications wherein weight and size are to be minimized such as for use in aircraft power supplies. However, the large current spikes concomitant to the operation of the self-saturating DC/DC power converter restricts the power levels that it can deliver without damaging the transistors, since the power engendered by the current spikes must be dissipated in the transistors. As an example, it is not uncommon for these current spikes to reach levels five times or greater than the reflected maximum load current for which a converter is designed. Unrestricted current spikes also contribute to troublesome noise. If these current spikes could be limited to levels below those resulting from the inherent operation of the self-saturating DC/DC converter, its usefulness could be greatly expanded to meet increased power requirements.

With the foregoing in mind, it is a primary object of the present invention to provide a new and improved self-saturating DC/DC power converter which is current limited so as to reduce current spikes.

It is a further object of the present invention to provide the current limitation through a simplified arrangement so as not to detract from the simplicity of the converter itself.

These objects and the means for achieving them through the present invention may be best appreciated by referring to the Detailed Description of the Invention which follows hereinafter together with the figures.

BRIEF DESCRIPTION OF THE INVENTION

A current sensing means is included in a self-saturating DC/DC power converter to provide a cutoff signal whenever the instantaneous switching element current rises to some predetermined level corresponding to the maximum level of current spikes tolerable. A cutoff circuit means is responsive to this cutoff signal for quickly switching off the conducting switching element so that current can no longer pass therethrough.

As will be seen from the preferred embodiment wherein the switching elements are transistors, the sensing means can be merely a resistor to develop a signal voltage which is a linear function of the current while the cutoff circuit means can be a pair of cutoff transistors, each being associated with a different one of the switching transistors, which is forward biased by the signal voltage to drive its associated switching transistor into cutoff by diverting its base current and also reverse-biasing it. The arrangement results in a current limiting circuit whose simplicity is consistent with that of the converter itself.

DETAILED DESCRIPTION OF THE INVENTION

Figure 1:
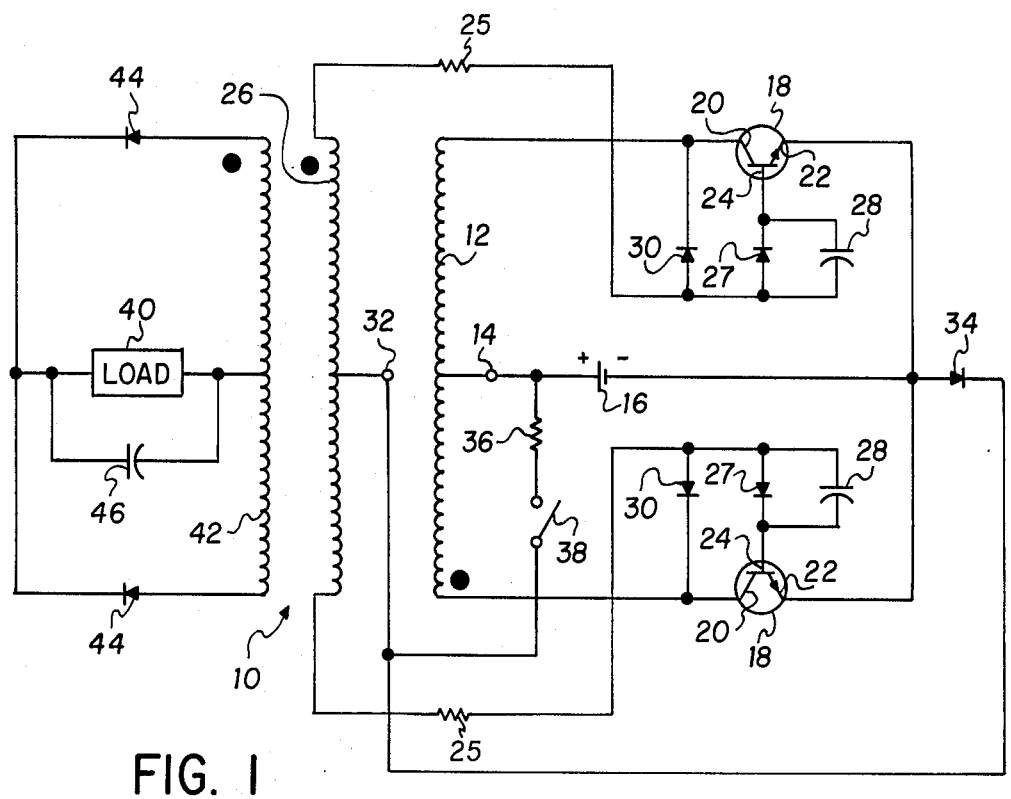
FIG. 1 is a schematic diagram of a typical self-saturating DC/DC converter in which current limiting may be advantageously employed.

As shown in FIG. 1, a typical self-saturating DC/DC power converter comprises a transformer 10 having a plurality of windings, including an input winding 12 with a center tap 14 which is connected to the positive terminal of a DC power supply, such as battery 16, and a pair of switching elements such as transistors 18. The collector 20 of each switching transistor 18 is connected to a different one of the ends of input winding 12 while the transistor emitters 22 are connected in common to the negative terminal of battery 16. The base 24 of each transistor 18 is connected through a base drive resistor 25 to a different one of the ends of a control winding 26 of transformer 10 via a diode 27 which is in parallel with a capacitor 28. An individual diode 30 also connects the collector 20 of each switching transistor 18 to the same end of control winding 26 as its base 24. A center tap 32 of control winding 26 is connected to the negative terminal of battery 16 through a diode 34 and to the positive terminal of battery 16 through a starting resistor 36 and a switch 38.

Power is supplied to a load 40 from the converter through an output winding 42 of transformer 10 by connecting the load 40 between a center tap of winding 42 and its ends via rectifying diodes 44. A capacitor 46 is provided across the load 40 to ensure a smooth output voltage.

Since the theory of operation of the self-saturating DC/DC converter is well known, it need be only briefly described herein. Operation of the converter is initiated by supplying current to the bases 24 of switching transistors 18 through the starting resistor 36 and control winding 26 upon closure of switch 38. Because of slight differences in their characteristics, one of the switching transistors 18 will be driven into conduction before the other. Once the converter is started, the switching transistors 18 alternately conduct current, each current path being through the battery 16 via the collector-emitter junction of the conducting transistor 18 and the half of input winding 12 to which it is connected. Using the conventional transformer dot notational system, whereby current into the dotted end of a transformer winding induces current to flow out of the dotted ends of the other transformer windings magnetically coupled thereto, it will be seen that the switching transistor 18 collector current passing through half of the input winding 12 induces a current in control winding 26 which provides a base drive via resistor 25 to the conducting transistor 18 for driving it hard into saturation so long as the transformer 10 is not itself in saturation which maintains the transistor 18 in conduction through regeneration. The base current path consists of the base-emitter junction of the conducting transistor 18, diode 34, the half of control winding 26 to which the conducting transistor 18 base is connected, resistor 25 and diode 27 in parallel with capacitor 28. Until transformer saturation begins, the current through the collector of the conducting switching transistor 18 is essentially the load current of output winding 42 reflected back to the input winding 12 by the transformer turns ratio (the transformer magnetizing current supplied by battery 16 being small relative thereto). Once the transformer 10 begins to saturate, the collector current begins to rise extremely rapidly to a level which can no longer be sustained by the base drive current induced in control winding 26. At this point, the collector current begins to rapidly decay to zero through degeneration as a result of the decreasing base drive, which causes a polarity reversal in the magnetic flux of transformer 10 and a resultant forward-bias voltage to be induced in control winding 26 for turning on the non-conducting switching transistor 18. Turn-on of the non-conducting switching transistor 18 is related to the speed with which the transformer magnetic flux increases with the reverse polarity as determined by the declining current through the conducting switching transistor 18. Thus, turn-on of the non-conducting switching transistor 18 may be ensured by enhancing the swift cutoff of the conducting transistor 18 through diodes 27 and 28 which reduce transistor storage time and capacitor 30 which provides a base discharge current path.

The upper level at which the transistor 18 collector current begins to decrease, as determined by the transistor and transformer characteristics, may be as much as five times or greater than the magnitude of the maximum normal reflected load current for which the converter is designed. This extremely high peak together with the small transition period for the collector current to rise and then decrease to zero (which may be no more than 2–3 microseconds as compared with an overall conduction period of 25 microseconds at a frequency of 20 kilohertz) results in current spikes which can produce troublesome noise and may damage the transistors 18. To avoid these undesirable effects, which are aggravated by environmental temperature rises that causes transistor gain to increase and consequently current spikes, the current spikes are restricted to tolerable levels by limiting the base current drive to transistor 18. Unfortunately, this limitation on base current drive also limits the power delivery capability of the converter so that its full potential cannot be realized.

Figure 2:
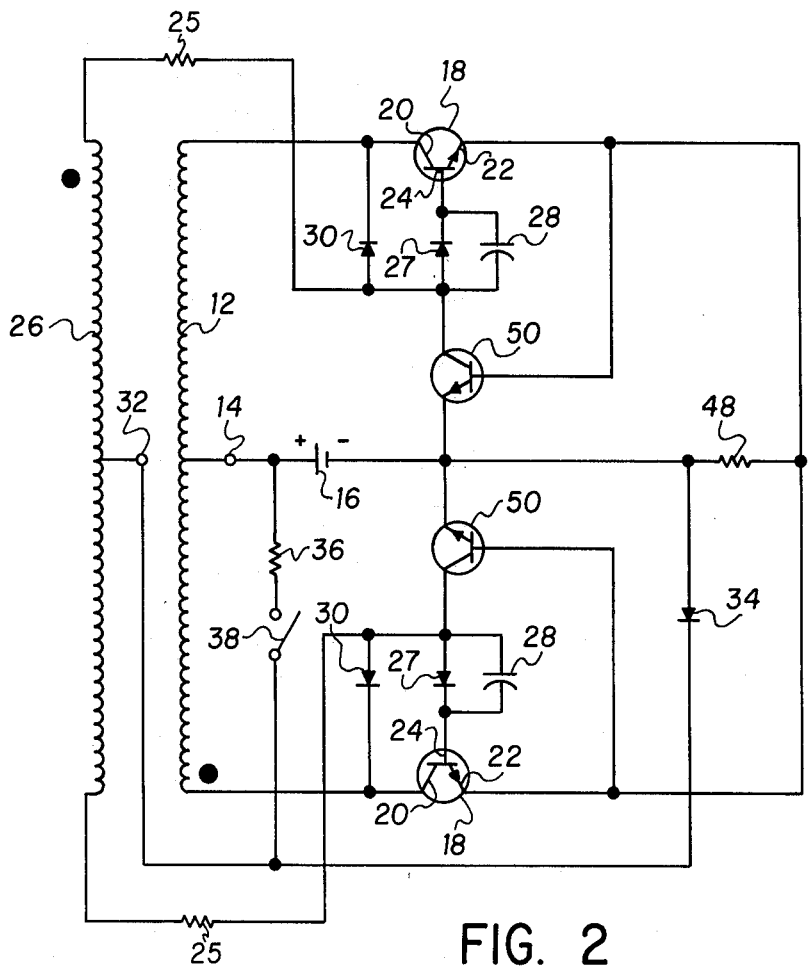
FIG. 2 shows the relevant portions of the converter of FIG. 1 modified so as to achieve current limiting through the preferred embodiment or the current limiting circuit.

As shown in FIG. 2, the base drive current limitation for limiting current spikes can be eliminated by limiting the current spikes through a current limiting circuit comprising a current sensing means, such as resistor 48 and a cutoff circuit means such as the pair of cutoff transistors 50. The resistor 48 is connected in series with the battery 16 and across the base-emitter junction of the cutoff transistors 50 so that the voltage developed across the resistor 48, which is a linear function of the current through the conducting transistor 18 is poled for forward biasing the transistors 50. Because the collector-emitter junction of each transistor 50 is connected between the negative terminal of battery 16 and the base 24 of a different one of the switching transistors 18 with which it is associated, it will be readily seen that once the voltage across resistor 48 is high enough to forward-bias cutoff transistors 50 into conduction, the cutoff transistor 50 connected to the base 24 of the conducting switching transistor 18 will divert base current therefrom through its collector-emitter path causing its associated switching transistor 18 to begin turning off. Thus, the turn-off of a conducting switching transistor 18 is precipitated by the turn-on of its associated cutoff transistor 50. It will be further seen that the voltage across resistor 48 is in a direction to reverse-bias a conducting switching transistor 18 by application across its base-emitter junction via the collector-emitter path of the associated cutoff transistor 18 once the latter turns on. This enhances cutoff of the switching transistor 18. Thus, the turn-on of a cutoff transistor 50 in response to the forward-bias voltage across resistor 48 causes the turn-off of its associated switching transistor 18 through the dual action of diverting its base current and applying a reverse bias thereto. The latter is materially aided by the parallel combination of diode 27 and capacitor 28 which introduces an additional 0.7 volts in the reverse-bias path through resistor 48 to achieve cutoff. It should be noted that temperature rises which increase the gain of switching transistor 18 and which ordinarily would aggravate the current spike problem by increasing spike levels, also reduce the turn on voltage of the cutoff transistor 50. Consequently, at higher temperatures, the cutoff transistor 50 will turn on sooner so as to offset the detrimental current spike effects to which the switching transistor 18 would otherwise be subjected.

Since the current through a conducting switching transistor 18 for achieving the necessary forward bias voltage across resistor 48 for turning on the cutoff transistors 50 can be set to any predetermined level by selecting the appropriate value of resistance for resistor 48, current spikes can be limited to any value above that necessary to maintain converter operation. For example, if the resistance of resistor 48 is chosen to produce a voltage of approximately 0.3 to 0.4 volts for a reflected maximum load current therethrough corresponding to full load, no significant conduction of a cutoff transistor 50 will occur at this time to unintentionally initiate turn-off of the conducting switching transistor 18. However, as soon as the transistor current spike rises to about twice the load value, the resultant 0.7 volts across resistor 48 will drive the cutoff transistor 50 into conduction and simultaneously provide a reverse bias (together with the voltage across capacitor 28) ensuring the swift cutoff of the associated conducting switching transistor 18. Thus, instead of current spikes which may be five times or greater than the reflected maximum load current, the current spikes may be limited to twice this load value which is enough to sustain converter operation. It should be mentioned that although the presence of resistor 48 adds to the power dissipated in the converter because of the passage of reflected load current therethrough, the additional power consumed is more than compensated for in the reduction in current spike related power losses which are normally more significant than the load related losses. Consequently, the current limiting circuit including resistor 48 reduces, rather than increases, the converter total power dissipation losses. In addition to the simplicity of the current limiting circuit of FIG. 2, it should be noted that it can be incorporated into the converter of FIG. 1 through merely one reconnection, namely, removing the emitters 22 from the negative terminal of battery 16 and reconnecting them thereto through resistor 48.

It should be readily apparent that the current limiting circuit disclosed herein can be added to a self-saturating DC/DC converter to either reduce the current spikes obtained with existent power levels or alternatively, to increase power levels without increasing existent current spikes. In the example alluded to, wherein current spikes are limited to twice the reflected maximum load current, the power delivery capability could be easily doubled without exceeding the existent level of current spikes. It is further apparent that the current limiting feature can be achieved by the simple addition of few elements which do not detract from the simplicity of the converter itself nor require any material rearrangement thereof. Since modification to the disclosure of the preferred embodiment herein can obviously be made by those skilled in the art without departing from the scope and spirit of the invention, the disclosure is intended to be merely illustrative and not restrictive of the invention as will now be claimed hereinbelow.

What is claimed is:

1. A current limited self-saturating DC/DC converter comprising:
   a transformer having a control winding and an input winding with a center tap for connection to one terminal of a DC power supply;
   current sensing means for providing a cutoff signal whenever the current therethrough attains some predetermined level;
   a pair of switching transistors, each having its collector-emitter path connected between a different end of the input winding of said transformer and the other DC power supply terminal via said current sensing means for passing current when enabled;
   circuit means for connecting the bases of said switching transistors to opposite ends of the control winding of said transformer for alternately enabling said transistors via the DC power supply and said current sensing means, and
   cutoff circuit means connected to the bases of said switching transistors for inhibiting the passage of current therethrough in response to said cutoff signal.

2. The converter of claim 1 wherein said current sensing means is a resistor connected in series with the DC power supply across which said cutoff signal is developed.

3. The converter of claim 2 wherein said cutoff circuit means comprises a pair of cutoff transistors which are forward-biased by said cutoff signal, each being connected to a different one of said switching transistors for diverting its base current upon conduction.

4. The converter of claim 3 wherein said cutoff signal reverse-biases each of said switching transistors through the collector-emitter path of its associated cutoff transistor when conducting.

* * * * *

UNITED STATES PATENT OFFICE
CERTIFICATE OF CORRECTION

PATENT NO. : 3,927,363
DATED : December 16, 1975
INVENTOR(S) : Daniel M. Mitchell; Robert H. Sternowski It is certified that error appears in the above-identified patent and that said Letters Patent are hereby corrected as shown below:

Page 1, Inventors: Delete "Ternowski" and substitute therefor --Sternowski--.

Signed and Sealed this ninth Day of March 1976

[SEAL]

Attest:

RUTH C. MASON
Attesting Officer

C. MARSHALL DANN
Commissioner of Patents and Trademarks